UNITED STATES PATENT OFFICE.

FRITZ SINGER, OF OFFENBACH-ON-THE-MAIN, GERMANY, ASSIGNOR TO CORPORATION OF CHEMISCHE FABRIK GRIESHEIM ELEKTRON, OF FRANKFORT-ON-THE-MAIN, GERMANY.

PROCESS OF MAKING VAT DYES OF THE ANTHRACENE SERIES.

1,044,933.  Specification of Letters Patent.  Patented Nov. 19, 1912.

No Drawing.  Application filed June 20, 1911. Serial No. 634,286.

*To all whom it may concern:*

Be it known that I, FRITZ SINGER, doctor of philosophy, chemist, a subject of the German Emperor, and resident of Offenbach-on-the-Main, in the Grand Duchy of Hesse, Germany, with post-office address Mainstrasse No. 179, have invented new and useful Improvements in Processes of Making Vat Dyes of the Anthracene Series, of which the following is a specification.

In United States Letters Patent Nos. 855248 and 739145 it has been described, that aluminium-chlorid reacts upon 1-amino-anthraquinone and 2-aminoanthraquinone by heating, whereby vat dyes are formed. I have found that other derivatives of the anthraquinone containing intact keto groups of the general formula:

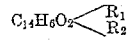

wherein $R_1$ and $R_2$ mean H, $CH_3$, Cl, $SO_3H$, CN, CNS, OH, all of which I consider to be equivalents within the scope of this invention, for instance chloro- and sulfo-cyanate-anthraquinones, the anthraquinone itself and its homologues yield when heated with aluminium-chlorid real vat dyestuffs. Even the sulfonic acids of the anthraquinone react in form of their salts with aluminium chlorid producing vat dyes, by which process probably the sulfonic group is split off.

The new dyestuffs are distinguished by the following properties. They are black powders, insoluble in water and organic solvents; difficultly soluble in concentrated sulfuric acid 66° Bé. yielding green to brown solutions; soluble in hot alkaline hydrosulfite solutions with orange red to green black color, dyeing cotton very fast gray to brown shades.

The dyestuffs are not identical with the dyestuff described in German Letters Patent 194197. The dyestuff obtained from anthraquinone for instance is distinguished from the dyestuff of the said patent by yielding with a solution of sodium sulfid a green vat, from which cotton is dyed gray shades and especially by its fastness against the action of chlorin.

The following examples will serve to illustrate the nature of my invention; parts being by weight.

Example I: 100 parts of anthraquinone are well ground with 75 parts of sublimated aluminium chlorid and heated up from 250° to 300° for one hour. The mass melts at 150° C. getting dark and developing hydrochloric acid while forming. The thus obtained black dyestuff-powder can be purified by means of hydrochloric acid or used directly for dyeing purposes. It yields with a solution of alkaline hydrosulfite a black-violet vat, from which cotton is dyed brown shades.

Example II: 100 parts of 2-sulfocyanate-anthraquinone are well ground with 80 parts of sublimated aluminium-chlorid and heated up to 250°. The thus obtained dyestuff dissolves in a solution of alkaline hydrosulfite with red-brown color. From this vat cotton is dyed bronze-brown shades.

Some of the dyestuffs obtainable according to the present process are described in the following table:

| Dyestuff obtained from— | Color of the dyestuff powder. | Color of the vat. | Dyes cotton. |
|---|---|---|---|
| Anthraquinone | Black | Black-violet | Brown. |
| Naphthanthraquinone | Black | Orange-red | Gray. |
| 1-chloroanthraquinone | Black | Green-black | Reddish-gray. |
| 2-chloroanthraquinone | Black | Green-black | Reddish-bronze-brown. |
| 2-sulfocyanate-anthraquinone | Black | Red-brown | Bronze-brown. |

Now what I claim and desire to secure by Letters Patent is the following:

1. The process for the production of vat dyes of the anthracene series consisting in heating derivatives of the anthracene series, containing intact keto groups of the general formula:

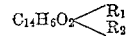

wherein $R_1$ and $R_2$ mean substituents with anhydrous aluminium chlorid.

2. As a new article of manufacture the coloring matter of the anthracene series, which can be obtained by treating anthraquinone with anhydrous aluminium-chlorid, which coloring matter is black powder, insoluble in water, caustic soda lye and organic solvents, difficultly soluble in concentrated sulfuric acid with green color, yielding with alkaline hydrosulfite solution a black-violet vat, from which cotton is dyed brown shades fast against the action of chlorin, difficultly soluble in sodium sulfid solution with green color, from which solution cotton is dyed gray shades fast against the action of chlorin.

In testimony, that I claim the foregoing as my invention, I have signed my name in presence of two witnesses, this eighth day of June 1911.

FRITZ SINGER.

Witnesses:
   PETER LAUTENSCHLÄGER,
   FRITZ DÉSOR.